Sept. 20, 1971   J. T. ENDERS   3,605,275
FLUIDIZED BED DRYER
Filed July 24, 1969
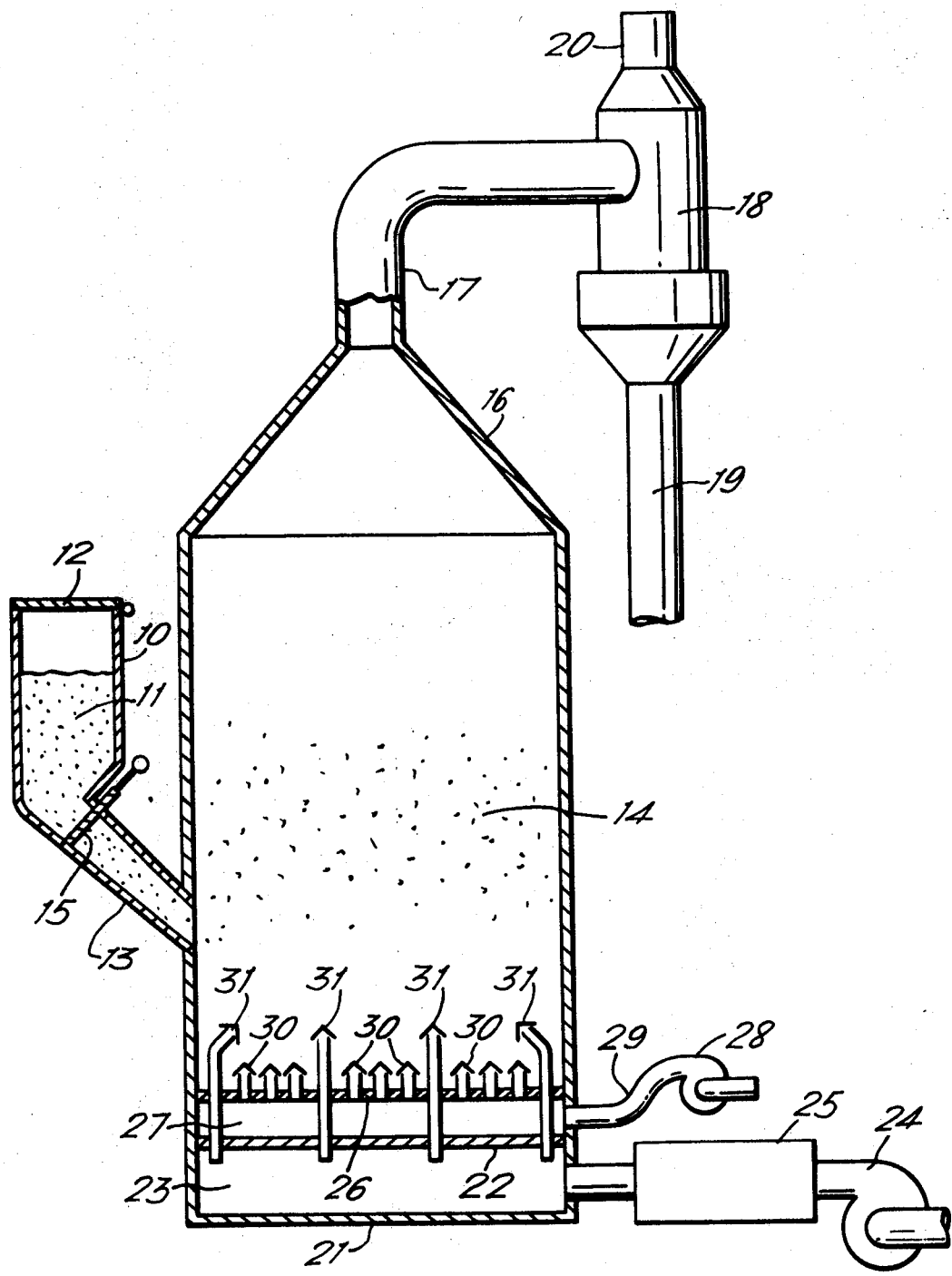

3,605,275
FLUIDIZED BED DRYER
Joseph T. Enders, Berkeley, Ill., assignor to
Struthers Wells Corporation
Filed July 24, 1969, Ser. No. 844,257
Claims priority, application Great Britain, July 29, 1968,
35,994/68
Int. Cl. F26b 17/10
U.S. Cl. 34—57A                    2 Claims

ABSTRACT OF THE DISCLOSURE

In a fluidized bed dryer, cold air is introduced into the bottom of the dryer and hot air is introduced at a higher level, the mixture of air at different temperatures fluidizing and drying material in the dryer.

BACKGROUND OF THE INVENTION

When certain materials are being dried in a fluidized bed dryer, such as ammonium sulphate, other chemicals, and many polymers, some particles move downward to bake in the hottest air entering the base of the dryer and aggregate to form globs which defluidize the bed.

SUMMARY OF THE INVENTION

Cold air is introduced into the bottom and lower sides of a fluidized bed dryer to prevent the baking and aggregation of particles in the lower portion of the dryer as hot air is introduced above the cold air to mix therewith and fluidize and dry particles in the dryer.

BRIEF DESCRIPTION OF THE DRAWINGS

The figure is a vertical section through a fluidized bed dryer according to this invention.

DESCRIPTION OF THE PREFERRED EMBODIMENT

A fluidized bed dryer has a hopper 10 which is charged with material 11 to be dried. Hopper 10 is loaded through an air tight lid 12. A chute 13 conducts material 11 to the chamber 14 of the fluidized bed dryer when the gate 15 is opened.

Chamber 14 has a conical top 16 from which a duct 17 leads to a conventional separator 18 from which dry product falls downward in duct 19 and fluidizing gas leaves through duct 20.

Bottom plate 21 and partition plate 22 form a hot gas chamber 23. Blower 24 passes air or any other gas through heater 25 to introduce a hot gas in chamber 23. Partition 26 forms a cold gas chamber 27 between itself and partition 22. Blower 28 and duct 29 introduce cold air or an unheated gas into chamber 27. A flow of cold gas enters chamber 14 from chamber 27 through the nozzles 30.

A flow of heated gas enters chamber 14 above the flow of cooler gas from the chamber 23 through the nozzles 31. The warmer and colder gases from nozzles 31 and 30 mix to fluidize and dry the material 11 in a conventional manner in chamber 14.

The gas in chamber 27 cools partition 26 so that particles cannot bake and aggregate thereon or on the nozzles 30. The relative temperatures of the gases in chambers 23 and 27 may be adjusted as desired in that the gas entering chamber 27 may be partially heated. Also the relative volumes of the gases entering the chamber 14 through nozzles 30 and 31 may be regulated as required. The flow of relatively cool gas from nozzles 30 may be sufficient to maintain particles of material 11 in a fluidized state and prevent the settling of this material on plate 26.

This invention allows the use of a higher temperature drying gas so that a smaller volume of gas may accomplish a given result. This allows the use of a smaller chamber 14 for a given dried chemical production.

What is claimed is:
1. In a fluidized bed dryer having a drying chamber, means introducing a hot fluidizing gas into the bottom of said chamber, means introducing into said chamber a material to be fluidized and dried, means conducting the fluidizing gas from the upper portion of said chamber, and means separating the dried material from said fluidizing gas, the improvement comprising, in combination, means introducing a cool fluidizing gas into said chamber below the hot fluidizing gas, said means introducing a hot fluidizing gas and said means introducing a cool fluidizing gas into said chamber being upper and lower partition plates in the bottom portion of said chamber, first nozzles passing through said upper and lower partition plates introducing the hot fluidizing gas from below said partition plates into said chamber, means introducing the cool fluidizing gas between said partition plates, and second nozzles passing through said upper partition plate introducing the cool fluidizing gas into said chamber, the cool fluidizing gas cooling said upper partition plate and said second nozzles preventing the baking and aggregation of particles thereon.

2. The combination according to claim 1 wherein said first nozzles extend above said second nozzles.

References Cited

UNITED STATES PATENTS

| | | | |
|---|---|---|---|
| 2,715,282 | 8/1955 | Niven, Jr. | 34—57AX |
| 3,215,508 | 11/1965 | Piester | 34—57AX |
| 3,277,582 | 10/1966 | Munro et al. | 34—57A |

FREDERICK L. MATTESON, JR., Primary Examiner

ROBERT A. DUA, Assistant Examiner

U.S. Cl. X.R.

23—288.35